Jan. 23, 1923.

L. O. FRENCH.
IGNITION DEVICE.
FILED Nov. 30, 1921.

1,443,175

INVENTOR
Louis O. French

Patented Jan. 23, 1923.

1,443,175

UNITED STATES PATENT OFFICE.

LOUIS O. FRENCH, OF MILWAUKEE, WISCONSIN.

IGNITION DEVICE.

Application filed November 30, 1921. Serial No. 518,929.

*To all whom it may concern:*

Be it known that I, LOUIS O. FRENCH, a citizen of the United States, and resident of Milwaukee, in the county of Milwaukee and State of Wisconsin, have invented new and useful Improvements in Ignition Devices, of which the following is a description, reference being had to the accompanying drawings, which are a part of this specification.

The invention relates to ignition devices and more particularly to a starting ignition device of the incandescent type for use with liquid fuel injection engines.

One of the objects of this invention is to provide an ignition device in which the incandescent element is positioned in a relatively fixed chamber or tube having a passage, communicating with the combustion chamber of the engine, controlled by a valve so situated with relation to the fuel injector that it serves to deflect fuel directed against it into said fixed chamber and against the incandescent element.

A further object of the invention is to provide a starting ignition device provided with an electrically heated element with a valve controlling the passage of gas or fuel to said device and means for automatically controlling the flow of current to said element on the operation of said valve.

Figure 1:
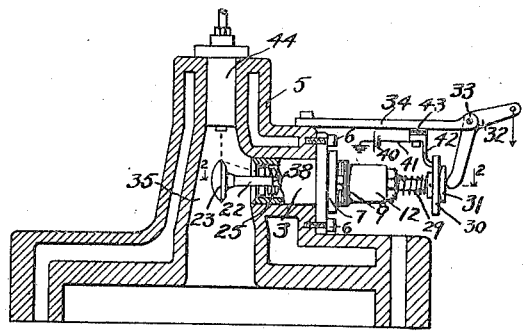
Figure 2:
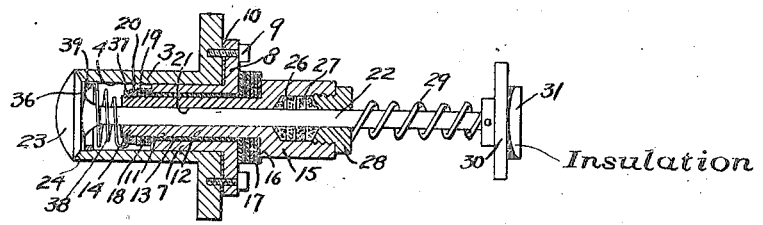

In the drawings: Fig. 1 is a view of the ignition device embodying the invention, showing it applied to an engine; Fig. 2 is a sectional view through the ignition device.

In the drawings the numeral 3 designates the shell or body of the plug having a bore 4 therein. This shell is preferably formed separate from the cylinder head 5 of the engine and is detachably secured thereto by bolts 6.

A second shell 7 fits in the outer end of the bore 4 and is provided with a flanged end 8 receiving bolts 9 which detachably secure it to the shell 3, a sealing gasket 10 being interposed between said flanged end and the outer end of the shell 3.

The shell 7 is provided with a central bore 11 and supports a valve guide member 12 which is spaced therefrom by a sleeve 13 of insulating material. This member 12 is provided with an inner threaded end 14 and an enlarged outer end 15 forming a shoulder 16. Washers 17 of insulating material are interposed between the shoulder 16 and the shell 4, and washers 18 of insulating material are interposed between the shell 4 and a metal washer 19. A clamping nut 20 on the threaded end 15, when screwed up, brings the insulating washers into close contact with the shell 4 and the member 12 to seal the joints. Thus the member 12 is insulated from but supported in the shell 4.

The member 12 is provided with a central bore 21 in which the stem 22 of a valve 23 works. This valve cooperates with a valve seat 24 in the shell 3 to control the passage of gas or fuel into the chamber 25. To prevent leakage along the valve stem the end 15 is provided with an enlarged bore 26 and suitable packing 27 is disposed in the cavity formed thereby and compressed against the valve stem by a gland nut 28. The valve stem 22 is slidably mounted in the bore 21 and a spring 29, interposed between the gland nut 28 and a spring seat member 30, acts to retain the valve in a normally closed position.

The member 30 is provided with a pad 31 of insulating material adapted to be engaged by a lever 32 journalled on a shaft 33 carried by a bracket 34 mounted on the cylinder head 5 and adapted to be turned by hand or any suitable mechanism to move the valve against the pressure of the spring 29 to an open position and retain it in such position until released. The chamber 25 is thus placed in communication with a portion 35 of combustion chamber of the engine when the valve is in open position.

A heating-element-clamping ring 36 fits tightly in the shell 3, as by a taper fit, adjacent the valve seat 24, and a clamping nut 37 fits onto the threaded end 14 of the member 12.

A heating element 38 of material capable of resisting high temperatures, such as chromel, nichrome, or other suitable material, has one end seated in a groove 39 and is pressed into tight contact with the shell 3 by said ring and then passes spirally around the valve and its stem and in spaced relation thereto and has its other end secured between the nuts 37 and 28. In case said element burns out, it may be readily replaced on removing the ring 36, withdrawing the shell 4 from the shell 3 and loosening the nut 37.

Current from a battery 40 is led through conductor 41 to a switch element 42 mounted on an insulating block 43 carried by the bracket 34, said element being somewhat yieldable and depending from said bracket in a position to be engaged by the member 30 after the valve has been moved off its seat, the current then flowing from element 42 to the valve stem and thence to the member 12, nut 37, heating element, 38, shell 3 to ground and then to the other terminal of the battery. The member 12 thus forms an insulated electrode through which the current passes to the element 21. Thus, when the valve 23 is moved to open position current is supplied to the heating element, which then becomes incandescent, and when the valve closes the member 30 breaks contact with the element 42 before the valve is seated.

The ignition device is mounted in the cylinder-head in such a position as to cause fuel introduced into the combustion chamber of the engine by an injector 44 to impinge upon the valve when it is in open position, as shown in Fig. 1, and be deflected thereby into the chamber 25 where it comes in contact with air therein, highly heated by the element 21, and with said element thereby igniting and gasifying a part of the fuel and through its flame propagation igniting the charge. After a few revolutions of the engine the cylinder walls become heated so that if the compression is high enough the valve may be closed, or a hot surface in the combustion chamber may be relied upon for ignition after starting and after the valve 23 has been closed, as will be readily understood by those skilled in this art.

I desire it to be understood that this invention is not to be limited to any specific form or arrangement of parts except in so far as such limitations are specified in the claims.

What I claim as my invention is:

1. In an ignition device, the combination of a relatively fixed chamber having an opening communicating with the combustion chamber of the engine, an electrically-heated element disposed in said chamber, means for supplying current to said element, and a valve independent of said element for controlling said opening and serving when open to deflect fluel, injected against it, upon said element.

2. In an ignition device, the combination of a relatively fixed chamber having an opening communicating with the combustion chamber of the engine, an electrically-heated element in said chamber, means for supplying current to said element, a valve, independent of said element, for controlling said opening and serving when open to deflect fuel, injected against it, upon said element, and means operable on the movement of the valve to control the flow of current to said element.

3. In an ignition device, the combination of a chamber having an opening communicating with the combustion chamber of the engine, of an electrically-heated element in said chamber, means for supplying current to said element, an outwardly opening spring-returned-valve and fuel deflector controlling said opening and when open deflecting fuel upon said element, and means for moving said valve to open position.

4. In an ignition device, the combination with a cylindrical shell, of a valve guide member within and concentric with said shell and insulated therefrom and provided with a central bore, said shell having a valve seat portion, a valve having its stem mounted in said member and cooperating with said valve seat portion, an electrically-heated element secured to said guide member and to said shell and spaced from said valve within the chamber formed by said shell, and means for operating said valve, said valve forming a fuel deflector to direct fuel upon said element.

5. In an ignition device, the combination of a relatively fixed chamber having an opening communicating with the combustion chamber of the engine, an electrically-heated element in said chamber, means for supplying current to said element, a valve, independent of said element, for controlling said opening and serving when open to deflect fuel, injected against it, upon said element, a switch member, and means moved by said valve for engaging said switch member to establish current flow through said element on the opening of said valve.

In testimony whereof, I affix my signature.

LOUIS O. FRENCH.